(12) United States Patent
Takizawa et al.

(10) Patent No.: US 6,345,223 B1
(45) Date of Patent: Feb. 5, 2002

(54) LOCK-UP CONTROL DEVICE FOR VEHICLE

(75) Inventors: Satoshi Takizawa, Yokohama; Masato Koga, Atsugi; Mitsuru Watanabe, Hadano; Masatoshi Akanuma, Fujisawa; Shigeki Shimanaka, Hadano; Hiroyasu Tanaka, Zama; Junya Takayama, Oomiya, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/671,146

(22) Filed: Sep. 28, 2000

(30) Foreign Application Priority Data

Sep. 30, 1999 (JP) .......................................... 11-280362
Sep. 30, 1999 (JP) .......................................... 11-280416

(51) Int. Cl.[7] .............................................. G06F 19/00
(52) U.S. Cl. .......................... 701/53; 477/34; 477/166
(58) Field of Search ................................ 701/53, 51, 61, 701/67; 477/34, 166, 169, 174, 175

(56) References Cited

U.S. PATENT DOCUMENTS

| 5,547,438 | A |   | 8/1996  | Nozaki et al. ............... 477/169 |
| 5,616,099 | A |   | 4/1997  | Sakai .......................... 477/169 |
| 5,616,100 | A |   | 4/1997  | Sakai et al. ................. 477/169 |
| 5,685,800 | A | * | 11/1997 | Toukura ....................... 477/90 |
| 5,935,043 | A |   | 8/1999  | Watanabe et al. ........... 477/169 |

FOREIGN PATENT DOCUMENTS

JP        8-177540        7/1996

* cited by examiner

Primary Examiner—Yonel Beaulieu
(74) Attorney, Agent, or Firm—Foley & Lardner (57) ABSTRACT

A lock-up torque converter is equipped with a lock-up clutch. The lockup clutch may engage even when the vehicle is coasting (lock-up coasting). When an accelerator pedal is depressed in a stepwise manner during lock-up coasting, the lock-up clutch is temporarily disengaged. By setting the threshold value used for determination so that it is easier to determine that the accelerator pedal was depressed in a stepwise manner the lower the vehicle speed, the dual objectives of vibration suppression of the drive system and improvement of fuel cost-performance are realized.

5 Claims, 10 Drawing Sheets

LOCK-UP CONTROL DEVICE FOR VEHICLE

FIELD OF THE INVENTION

The present invention relates to a lock-up control device for a vehicle comprising a transmission and lock-up torque converter.

BACKGROUND OF THE INVENTION

In the vehicle equipped with a lock-up torque converter, when a lock-up clutch is engaged, the slip in the torque converter is lost, and fuel cost-performance is improved.

SUMMARY OF THE INVENTION

However, when the vehicle is coasting with the lock-up clutch engaged (referred to hereafter as "lockup coasting"), the vehicle body vibrates back and forth when the accelerator pedal is abruptly depressed in a step-shaped manner.

This is because, when the engine torque increases rapidly in a step-shaped manner and this is input to the drive system, the clutch, drive shaft, tires, etc. act as springs and the drive system vibrates as disclosed by JP-A-H8-177540 published by the Japanese Patent Office in 1996.

It is therefore an object of this invention to prevent the above-mentioned vibration from occurring even if the accelerator pedal is largely depressed during lock-up coasting.

In order to achieve above object, the present invention provides a lock-up control device for a vehicle comprising a transmission and a torque converter with a lock-up clutch. The device comprises a sensor which detects a vehicle speed, a sensor which detects either of a throttle opening and accelerator pedal depression amount, and a microprocessor programmed to determine whether an accelerator pedal was depressed in a stepwise manner based on either of the throttle opening and accelerator pedal depression amount, and release the lockup clutch when the vehicle is coasting and the lock-up clutch is engaged, and it is determined that the accelerator pedal was depressed in a stepwise manner. The microprocessor is further programmed to more easily determine that the accelerator pedal was depressed in a stepwise manner the lower the vehicle speed.

The details as well as other features and advantages of this invention are set forth in the remainder of the specification and are shown in the accompanying drawings.

DESCRIPTION OF THE PREFERRED EMBODIMENTS

Figure 1:
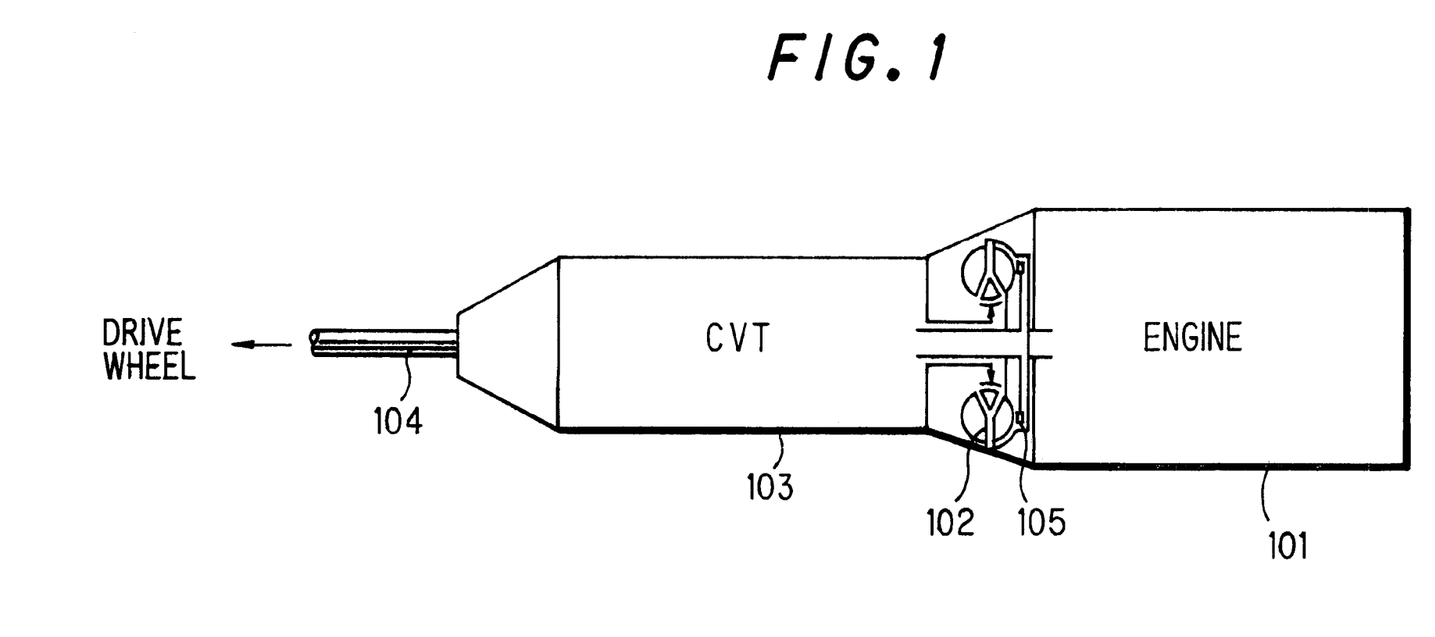
FIG. 1 is a schematic diagram of a vehicle according to this invention.

Referring to FIG. 1 of the drawings, a vehicle according to this invention is equipped with an internal combustion engine 101, lock-up torque converter 102, toroidal continuously variable transmission (CVT) 103 and drive shaft 104. The rotation of the engine 101 is transmitted to drive wheels, not shown, via the torque converter 102, CVT 103 and drive shaft 104.

The torque converter 102 is equipped with a lock-up clutch 105. When the lock-up clutch 105 is engaged, a friction disk provided together with an input shaft of the transmission 103 is pushed against a torque converter housing, the slip between an impeller and a turbine disappears, and the rotation speed of the engine 101 and the rotation speed of the input shaft of the transmission 103 coincide.

Figure 2:
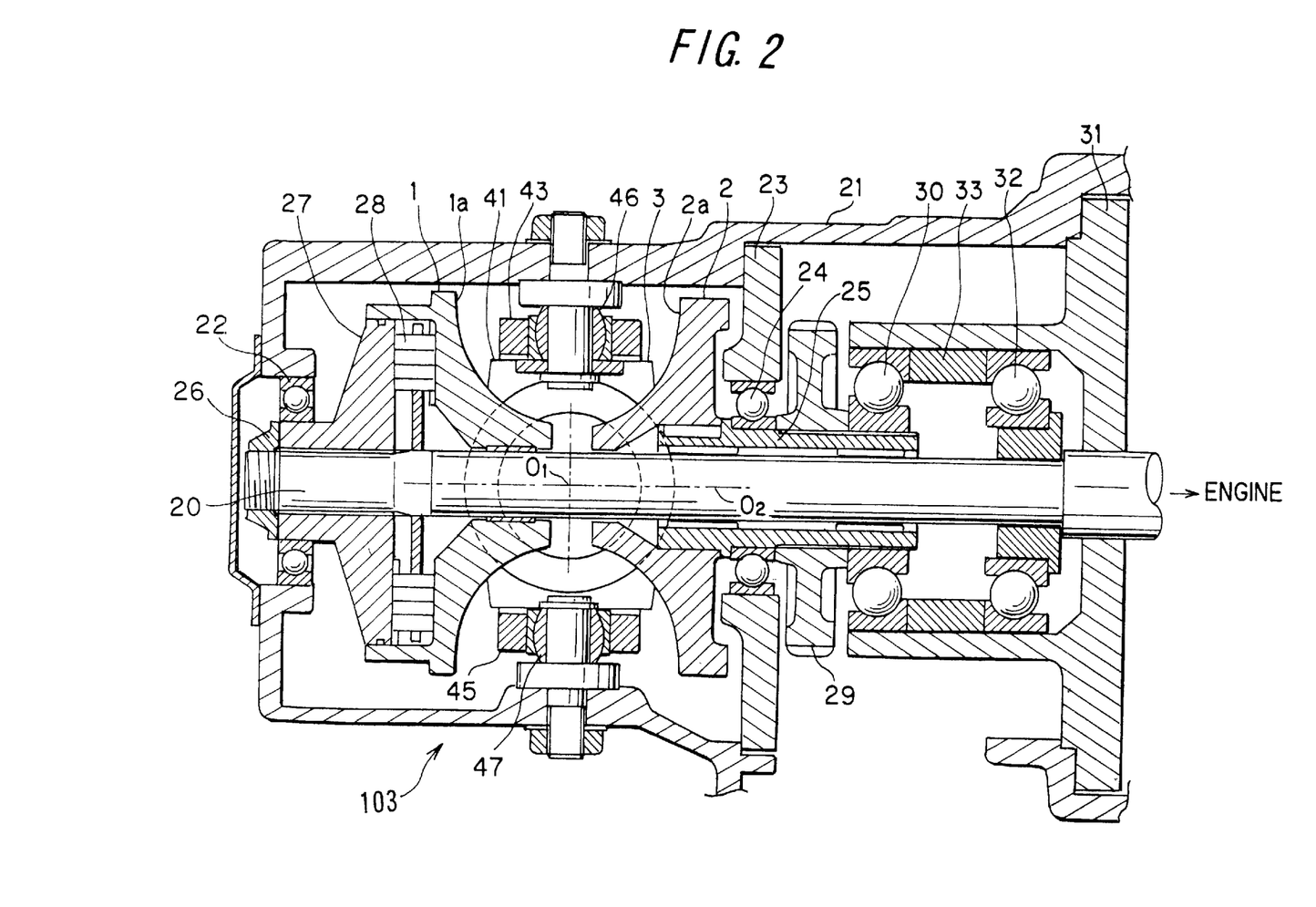
FIG. 2 is a longitudinal cross-sectional view of a toroidal continuously variable transmission according to this invention.

As shown in FIG. 2, the CVT 103 according to this invention comprises an input shaft 20 connected to an engine, not shown, via a torque converter. One end of the input shaft 20 is supported by a bearing 22 in a transmission case 21, and the middle is supported via a bearing 24 and a hollow output shaft 25 in an intermediate wall 23 of the transmission case 21.

An input disk 1 is supported by the input shaft 20. An output disk 2 is supported by the output shaft 25. The input disk 1 and output disk 2 are arranged so that their toroidal curved surfaces 1a, 2a face each other.

A pair of power rollers 3 disposed on either side of the input shaft 20 are gripped between the surfaces 1a and 2a.

In order to grip the power rollers 3 between the input disk 1 and output disk 2, a nut 26 is tightened at the tip of the input shaft 20. The nut 26 is tightened so that a cam disk 27 does not fall out of the input shaft 20. Cam rollers 28 are provided between the cam disc 27 and the input disk 1. The rotation of the input shaft 20 is transmitted to the input disk 1 via the cam rollers 28.

The rotation of the input disk 1 is transmitted to the output disk 2 via the power rollers 3. The cam rollers 28 generate a thrust force proportional to the transmitting torque, and grip the power rollers 3 between the input disk 1 and output disk 2.

The output disk 2 is spline jointed to the output shaft 25. An output gear 29 is fixed on the output shaft 25.

The output shaft 25 is supported by a cover 31 of the transmission case 21 via a radial thrust bearing 30. The input shaft 20 is supported by the cover 31 via a radial thrust bearing 32. The bearings 30, 32 cannot approach each other due to a spacer 33. Further, the bearings 30, 32 respectively contact an output gear 29 and the input shaft 20, and cannot move away from each other.

Therefore, the thrust force which acts on the input disk 1 and the output disk 2 due to the cam rollers 28 is cancelled at the spacers 33, and does not act on the transmission case 21.

Figure 3:
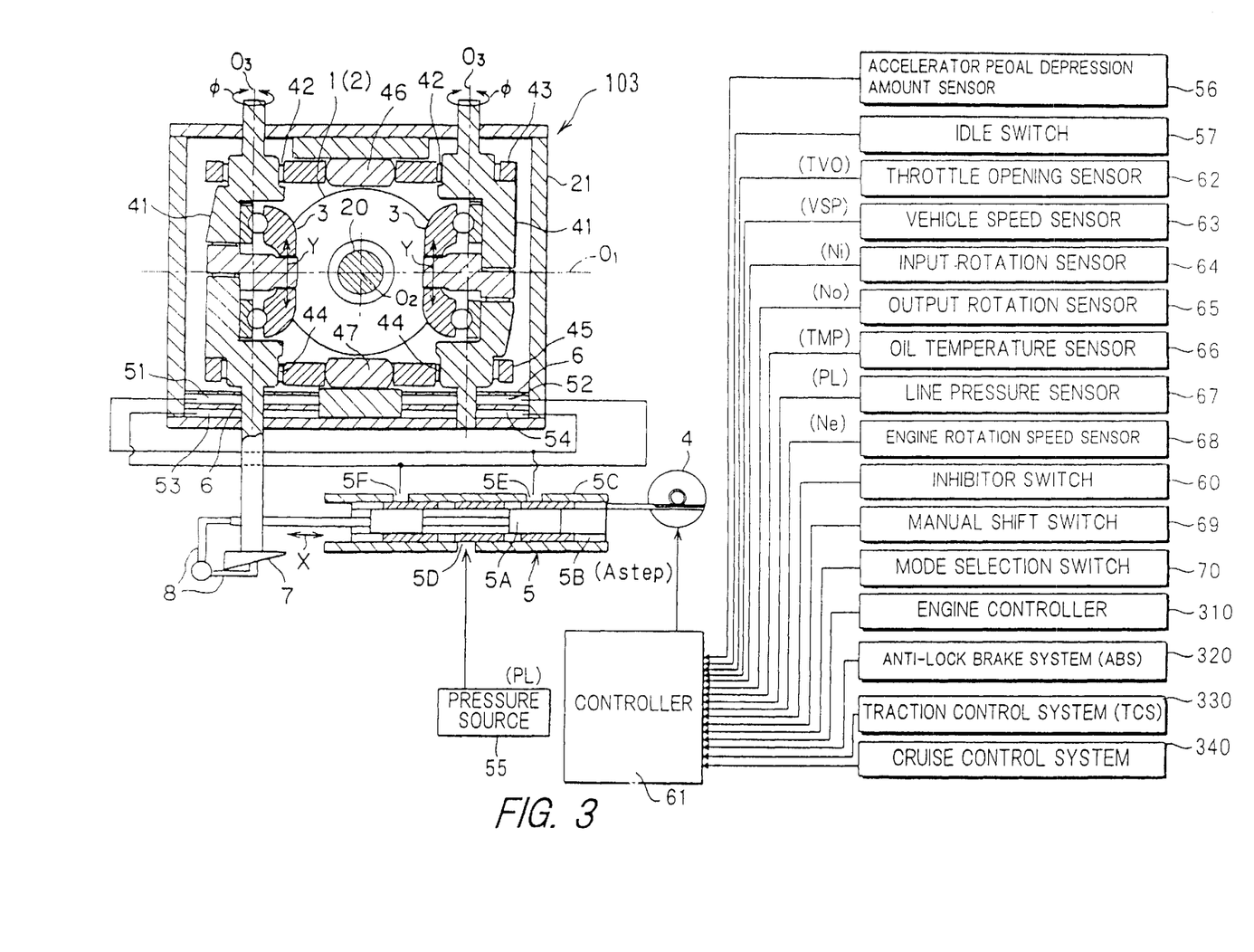
FIG. 3 is a transverse cross-sectional view of the transmission, and a schematic diagram of a speed ratio control device.

The power rollers 3 are supported free to rotate by trunnions 41, as shown in FIG. 3. The upper ends of the trunnions 41 are joined to an upper link 43 via a spherical joint 42 so that they are free to rotate and free to pivot, and their lower ends are joined to a lower link 45 via a spherical joint 44 so that they are free to rotate and free to pivot.

The upper link 43 and the lower link 45 are supported with their centers free to pivot on spherical joints 46, 47, and the trunnions 41 can be displaced vertically in synchronism in mutually opposite directions.

The speed ratio control device of the aforesaid transmission 103 will now be described referring to FIG. 3.

A piston 6 for displacing the trunnion 41 in a vertical direction is provided at each trunnion 41. Upper chambers 51, 52 and lower chambers 53, 54 are respectively formed on either side of these pistons 6. A speed ratio control valve 5 for controlling the displacement of each piston 6 is provided.

The speed ratio control valve 5 comprises a spool 5A, sleeve 5B and valve case 5C. The spool 5A and sleeve 5B fit together so that they are free to slide relative to each other. The sleeve 5B fits in a valve case 5C so that they are free to slide relative to each other.

A port 5D of the speed ratio control valve 5 is connected to a pressure source 55. A port 5E of the speed ratio control valve 5 is connected to the piston chambers 51, 54. A port 5F is connected to the piston chambers 52, 53.

The spool 5A operates together with a precess cam 7 fixed to the lower end of one of the trunnions 41 via a link 8. The sleeve 5B is engaged with a step motor 4 by a rack and pinion.

An operating command to the speed ratio control valve 5 is supplied as a displacement to the outer sleeve 5B by the step motor 4.

If the sleeve 5B displaces from the neutral position relative to the spool 5A due to this operating command, for example to the position shown in FIG. 3, the speed ratio control valve 5 will open, a fluid pressure (line pressure PL) will be supplied to the chambers 52, 53 from the pressure source 55, and the other chambers 51, 54 will be drained. The trunnions 41 then displace in mutually opposite directions up and down due to the pistons 6.

On the other hand, if the sleeve 5B displaces from the neutral position relative to the spool 5A in the reverse direction, the speed ratio control valve 5 will open, a fluid pressure will be supplied to the chambers 51, 54 from the pressure source 55, and the other chambers 52, 53 will be drained. The trunnions 41 then displace in mutually opposite directions up and down due to the pistons 6, 6.

As a result, the power rollers 3 are offset from the position where the rotation axis shaft $O_1$ intersects the rotation axis $O_2$ of the disks 1 and 2. The offset power rollers 3 receive a force from the disks 1 and 2, and gyrate around the rotation axis $O_3$ which is perpendicular to the axis $O_1$ so as to realize continuous variable speed change.

The precess cam 7 provided on a lower end of one of the trunnions 41 performs mechanical feedback of an offset Y and gyration angle $\phi$ of the trunnion 41 and power roller 3 as a displacement X of the spool 5A via the link 8.

When a speed ratio command value corresponding to a command value Astep to the step motor 4 is achieved by a continuously variable speed change, the spool 5A is returned to the neutral position relative to the sleeve 5B by the aforesaid mechanical feedback. Simultaneously, the power rollers 3 are returned to a position where the rotation axis $O_1$ intersects the rotation axis $O_2$ of the disks 1 and 2, thereby maintaining the aforesaid speed ratio command value.

In order to make the gyration angle $\phi$ of the power roller 3 a value corresponding to the speed ratio command value, it is sufficient for the precess cam 7 to feed back the gyration angle $\phi$ of the power roller 3. However, in order to prevent the speed ratio control from hunting, the offset Y of the power roller 3 is also fed back.

The command value Astep to the step motor 4 is determined by the controller 61.

The controller 61 comprises a microprocessor, read only memory, random access memory and input/output interface, and the following signals are input to the controller 61 as shown in FIG. 3.

accelerator pedal depression amount signal from accelerator pedal depression amount sensor 56.

signal showing the accelerator pedal is not depressed from an idle switch 57.

throttle opening signal TVO from a throttle opening sensor 62 sensor detected vehicle speed signal VSP from a vehicle speed sensor 63 transmission input rotation speed signal Ni (or engine rotation speed signal Ne) from an input rotation sensor 64 transmission output rotation speed signal No from an output rotation sensor 65 transmission oil temperature signal TMP from an oil temperature sensor 66 line pressure signal PL from a line pressure sensor 67 engine rotation speed signal Ne from an engine rotation speed sensor 68 shift lever position signal from an inhibitor switch 60 up-shift signal and down-shift signal from a manual shift switch 69 selected mode signal from a mode selection switch 70 torque-down signal from an engine controller 310 signal showing an operating state of an anti-lock brake system (ABS) 320 from the anti-lock brake system 320 signal showing an operating state of a traction control system (TCS) 330 from the traction control system 330.

auto-cruise signal from a cruise control system 340 Here, as the line pressure PL is controlled by the controller 61, it is usually detected from an internal signal of the controller 61. The vehicle speed sensor 63 detects the vehicle speed from a rotation speed of, for example, the output shaft of the transmission 103, a drive shaft or a driving wheel.

The controller 61 computes the command value Astep to the step motor 4 on the basis of the aforesaid input signals.

Figure 4:
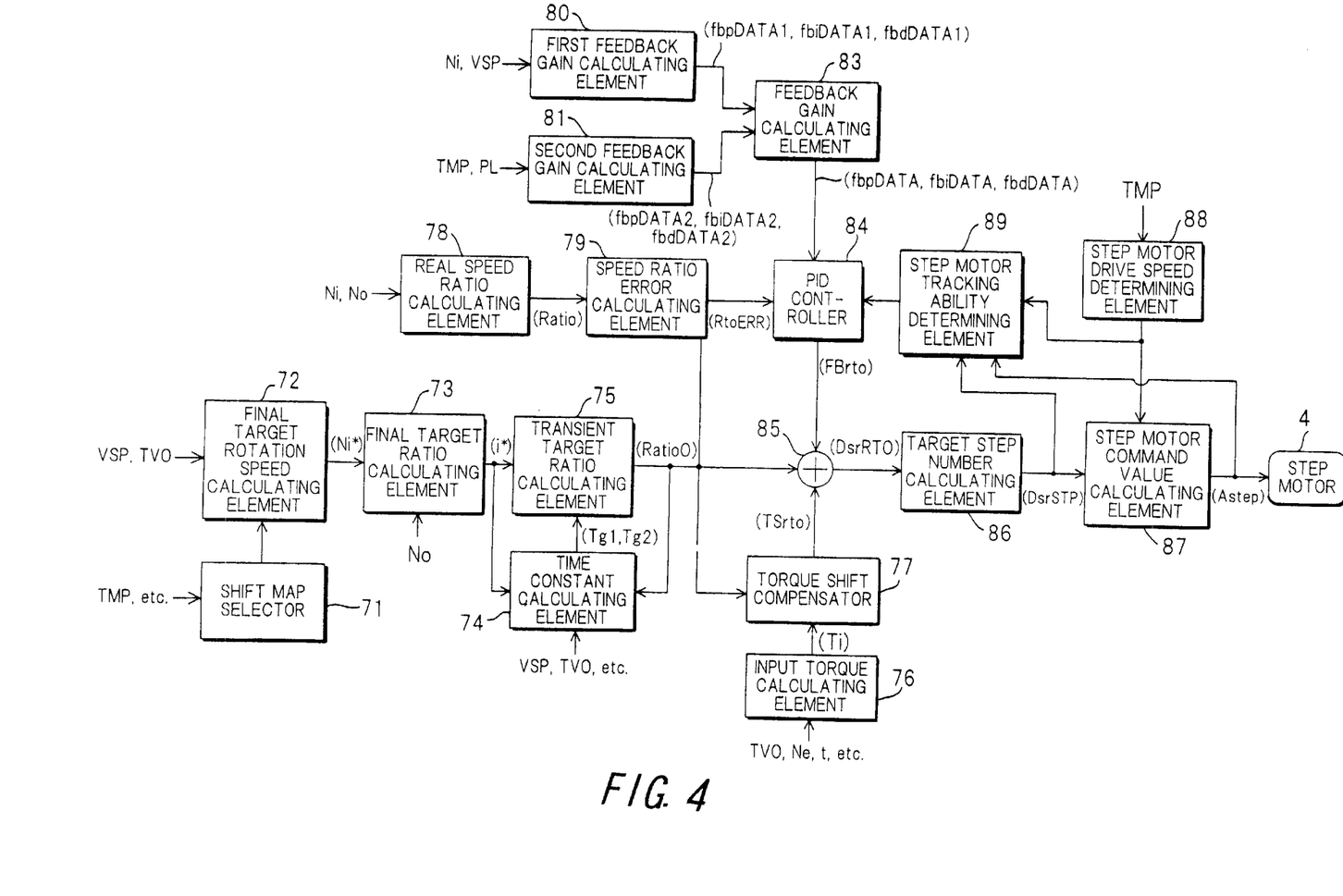
FIG. 4 is a block diagram of a controller of the speed ratio control device.

The controller 61 comprises the elements shown in FIG. 4. These elements actually comprise a computer program stored by the memory of the controller 61 or an electronic circuit of the controller 61.

Figure 5:
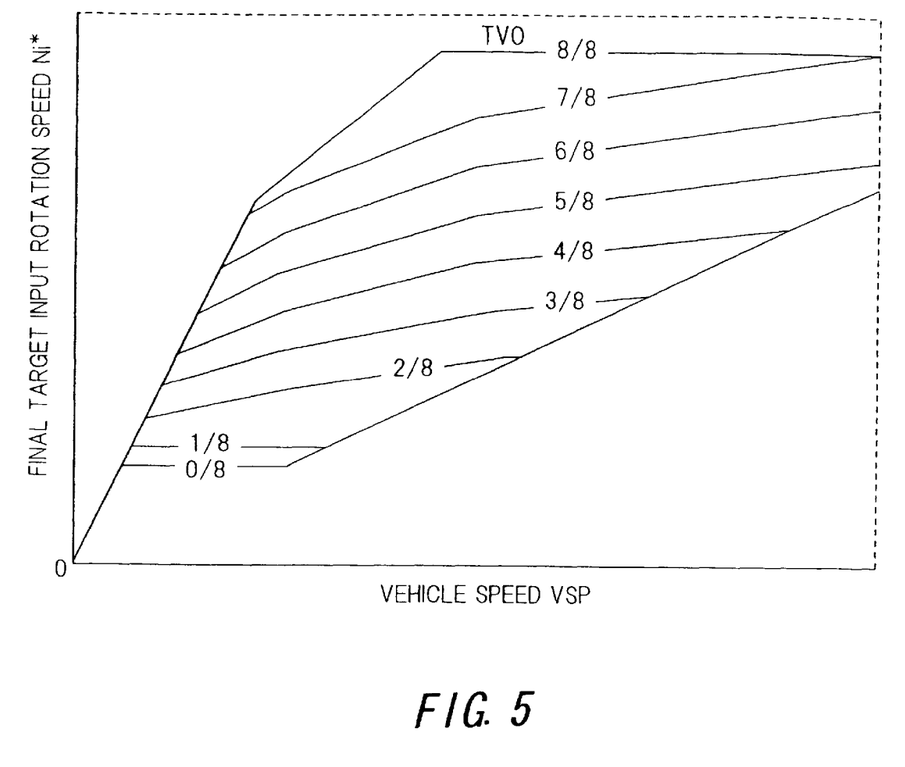
FIG. 5 is an example of a shift map used for speed change ratio control.

A shift map selector 71 selects a map to be used from among plural pre-prepared maps depending on the transmission oil temperature TMP, and whether or not an exhaust gas purification catalyst has activated. FIG. 5 is an example of a shift map.

A final target input rotation speed calculating element 72 calculates a final target input rotation speed Ni* by looking up the shift map shown in FIG. 5 based on the throttle opening TVO and vehicle speed VSP. The final target rotation speed Ni* is the target value of the input rotation speed in the steady running state.

A final target ratio calculating element 73 calculates a final target ratio i* by dividing the final target input rotation speed Ni* by the transmission output rotation speed No. The final target ratio i* is the target value of the speed ratio in the steady running state.

A time constant calculating element 74 determines a first speed change time constant Tg1 and second speed change time constant Tg2 used in speed change control according to the shift lever position (the normal running position "D" or sports running position "Ds", etc.), vehicle speed VSP, throttle opening TVO, engine rotation speed Ne, accelerator pedal depression rate, the torque-down signal, the anti-lock brake control signal, the traction control signal, the auto-cruise signal, and a speed ratio difference RtoERR between the real speed ratio Ratio and a transient target ratio Ratio0 described later, and computes a difference Eip between the final target ratio i* and transient target ratio Ratio0.

The first speed change time constant Tg1 and second speed change time constant Tg2 which are determined corresponding to a second order delay of the toroidal CVT 103, determine the speed change response relative to the final target ratio i*, and determine a speed change rate.

A transient target ratio calculating element 75 computes the transient target ratio Ratio0 and an intermediate speed ratio Ratio00 for bringing a real speed ratio Ratio close to the final target ratio i* with a speed response defined by the first speed change time constant Tg1 and second speed change time constant Tg2, and outputs the transient target ratio Ratio0.

An input torque calculating element 76 calculates a transmission input torque Ti. First, the input torque calculating element 76 calculates the engine output torque based on the throttle opening TVO and engine rotation speed Ne. Next, a torque ratio t of the torque converter is found based on the ratio of the input rotation speed (=Ne) and output rotation speed (=Ni) of the torque converter. Finally, the output torque of the engine is multiplied by the torque ratio t to compute the transmission input torque Ti.

A torque shift compensator 77 computes a compensation amount TSrto for compensating a torque shift (speed ratio deviation) peculiar to a toroidal CVT based on the transient target ratio Ratio0 and input torque Ti of the transmission 103.

During torque transmission, the power rollers 3 are gripped between the input disk 1 and output disk 2, so the trunnions 41 deform. Due to this deformation, the position of the precess cam 7 provided on the lower end of the trunnion 41 varies, and the characteristics of the mechanical feedback system comprising the precess cam 7 and link 8 vary resulting in the aforesaid torque shift.

As the torque shift of the toroidal CVT differs according to the transient target ratio Ratio0 and transmission input torque Ti, the torque shift compensator 77 calculates the torque shift compensation amount TSrto by looking up a predetermined two-dimensional map based on the transient target ratio Ratio0 and transmission torque Ti.

A real speed ratio calculating element 78 computes the real speed ratio Ratio by dividing the transmission input rotation speed Ni by the transmission output rotation speed No. A speed ratio error calculating element 79 subtracts the real speed ratio Ratio from the transient target ratio Ratio0 to compute the speed ratio error RtoERR (=Ratio0−Ratio).

A first feedback gain calculating element 80 computes a first proportional control feedback gain fbpDATA1, a first integral control feedback gain fbiDATA1 and a first differential control feedback gain fbdDATA1 according to the transmission input rotation speed Ni and vehicle speed VSP. The first feedback gains fbpDATA1, fbiDATA1 and fbd-DATA1 are used when a feedback correction amount FBrto is computed by PID control described later.

The first feedback gains fbpDATA1, fbiDATA1 and fbd-DATA1 are computed by looking up a predetermined two-dimensional map based on the transmission input rotation speed Ni and vehicle speed VSP.

A second feedback gain calculating element 81 computes a second proportional control feedback gain fbpDATA2, a second integral control feedback gain fbiDATA2 and a second differential control feedback gain fbdDATA2 according to the oil temperature TMP and line pressure PL of the transmission 103. The feedback gains fbpDATA2, fbi-DATA2 and fbdDATA2 are also used when the feedback correction amount FBrto is computed by PID control, described later.

The second feedback gains fbpDATA2, fbiDATA2 and fbdDATA2 are computed by looking up a two-dimensional map based on the transmission oil temperature TMP and the line pressure PL.

A feedback gain calculating element 83 multiplies corresponding first feedback gains and second feedback gains so as to compute a proportional control feedback gain fbp-DATA (=fbpDATA1×fbpDATA2), an integral control feedback gain fbiDATA (=fbiDATA1×fbiDATA2), and a differential control feedback gain fbdDATA (=fbdDATA1× fbdDATA2). A PID controller 84 computes a feedback correction amount by proportional control (=RtoERR× fbpDATA), a feedback correction amount by integral control (=∫{RtoERR×fbiDATA}), and a feedback correction amount by differential control (=(d/dt){RtoERR× fbdDATA}). These three feedback correction amounts are then added to compute the feedback correction amount FBrto (=RtoERR×fbpDATA+∫{RtoERR×fbiDATA}+(d/dt) {RtoERR×fbdDATA}) under PID control.

A transient target ratio corrector 85 corrects the transient target ratio Ratio0 by the torque shift compensation amount TSrto and the speed ratio feedback correction amount FBrto, and computes a compensated transient target ratio DsrRT0 (=Ratio0+TSrto+FBrto).

A target step number calculating element 86 computes a target step number DsrSTP of the step motor 4 which realizes the compensated transient target ratio DsrRT0 by looking up a predetermined map.

When the step motor 4 cannot displace to the aforesaid target step number DsrSTP during one control cycle even at the maximum drive speed of the step motor 4 determined according to the transmission oil temperature TMP by a step motor drive speed determining element 88, a step motor command value calculating element 87 takes a position which can be realized at the maximum drive speed of the step motor 4 as the command value Astep to the step motor 4. On the other hand, when the step motor 4 can displace to the aforesaid target step number DsrSTP during one control cycle, the target step number DsrSTP is set to the command value Astep to the step motor 4.

Therefore, it can be considered that command value Astep is the actual position of the step motor 4.

The step motor 4 rotates in the direction and position corresponding to the command value Astep, displaces the sleeve 5B of the speed ratio control valve 5 by the rack and pinion, and changes the speed ratio of the CVT 103.

When the speed ratio corresponding to the command value Astep is attained, the spool 5A is returned to the neutral position relative to the sleeve 5B by mechanical feedback via the precess cam 7. Simultaneously, the power rollers 3 are returned to the position at which the rotation axis $O_1$ intersects the rotation axis $O_2$ of the disks 1 and 2. Thereby, the speed ratio command value is maintained.

A step motor tracking ability determining element 89 determines whether or not the step motor 4 can follow the target step number DsrSTP corresponding to the compensated transient target ratio DsrRT0. First, the determining element 89 calculates a step number difference ASTP between the target step number DsrSTP and the command value Astep which can be considered as the actual position. When the step number error ASTP is smaller than a value ΔSTPLIM which the step motor 4 can eliminate during one control cycle at the maximum drive speed of the step motor 4 determined as described above by the step motor drive speed determining element 88 (ΔSTP<ΔSTPLIM), the determining element 89 determines that the step motor 4 can follow the target step number DsrSTP corresponding to the compensated transient target ratio DsrRT0. Conversely, when the step number error ΔSTP is larger than the value ΔSTPLIM (ΔSTP>ΔSTPLIM), it determines that the step motor 4 cannot follow the target step number DsrSTP.

When it is determined that the step motor 4 can follow the target step number DsrSTP corresponding to the compensated transient target ratio DsrRT0, the determining element 89 commands the PID controller 84 to continue the computing of the speed ratio feedback correction amount FBrto by the aforesaid PID control. On the other hand, when it is determined that the step motor 4 cannot follow the target step number DsrSTP, the determining element 89 commands the PID controller to maintain the speed ratio feedback correction amount ∫{EtoERR×fbiDATA} by integral control at its value at the time of the determination.

In the step motor command value calculating element 87, when the step motor 4 cannot displace to the target step number DsrSTP during one control cycle even at the maximum drive speed of the step motor 4, the position which can be realized at the maximum drive speed of the step motor 4 is taken as the command value Astep, and the command value Astep is used for the step motor tracking ability determination by the determining element 89 as the real position of the step motor 4. Hence, it is possible to know the real position of the step motor 4 when the tracking ability determination is performed from the command value Astep to the step motor 4. For this reason, it is unnecessary to actually detect the position of the step motor 4 to perform the tracking ability determination.

Further, in the step motor tracking ability determining element 89, when the step number error ΔSTF between the target step number DsrSTP and the actual drive position (=command value Astep) is smaller than the value ΔSTPLIM which is determined according to the maximum drive speed of the step motor 4 (ΔSTP<ΔSTPLIM), it is determined that the step motor 4 can follow the target step number DsrSTP corresponding to the compensated transient target ratio DsrRT0. Conversely, when the step number error ΔSTF is greater than the value ΔSTPLIM which is defined according to the maximum drive speed of the step motor 4 (ΔSTP≧ΔSTPLIM), it is determined that the step motor 4 cannot follow the target step number DsrSTP. Thus, the determination of the tracking ability of the step motor 4 can be performed precisely although the maximum drive speed of the step motor 4 varies according to the oil temperature TMP, etc.

Next, the speed ratio control performed by the controller 61 will be described referring to FIG. 6.

Figure 6:
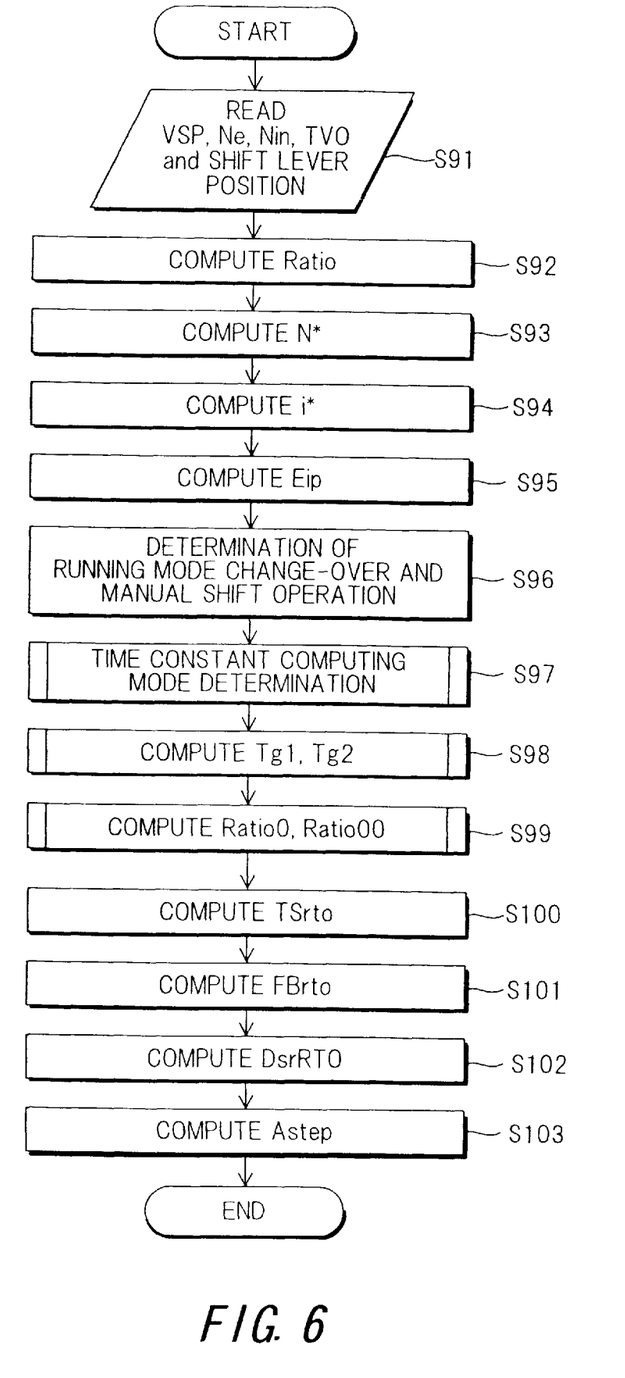
FIG. 6 is a flowchart for describing a main routine of speed change ratio control performed by the controller.

FIG. 6 shows the main routine of speed ratio control. This routine is performed at an interval of 10 milliseconds.

In a step S91, the vehicle speed VSP, engine rotation speed Ne, transmission input rotation speed Ni, throttle opening TVO and a shift lever position are read. The step S91 corresponds to processing of the time constant calculating element 74.

In a step S92, the real speed ratio Ratio is computed by dividing the input rotation speed Ni by the transmission output rotation speed No. The step S92 corresponds to processing by the final target input rotation speed calculating element 72.

In a step S93, the final target input rotation speed Ni* is computed based on the throttle opening TVO and vehicle speed VSP by looking up the map shown in FIG. 5. The step S93 corresponds to processing by the shift map selector 71 and the final target input rotation speed calculating element 72.

In a step S94, the final target ratio i* is computed by dividing the final target input rotation speed Ni* by the transmission output rotation speed No. The step S94 corresponds to processing by the final target ratio calculating element 73.

In a step S95, the difference Eip is computed by subtracting the transient target ratio Ratio0 computed on the immediately preceding occasion the routine was performed (this is computed at the next step S99) from the final target ratio i*. The step S95 corresponds to processing by the time constant calculating element 74.

In a step S96, it is determined whether or not there has been a running mode change-over, or a manual shift operation. Specifically, it is detected whether or not there is a change-over between a power mode and a snow mode according to the signal from a mode selection switch 70. It is detected whether the shift lever is in the manual mode according to the signal from the inhibitor switch 60, and whether an upshift signal or downshift signal is detected from a manual shift switch 69. The step S96 also corresponds to processing by the time constant calculating element 74.

In steps S97, 98 and 99, the time constant computing mode is determined, and the first and second speed change time constants Tg1, Tg2, the transient target ratio Ratio0 and the intermediate speed ratio Ratio00 are computed, respectively. The steps S97, 98 and 99 also correspond to processing by the time constant calculating element 74.

In a step S100, the torque shift compensation amount TSrto is computed based on the transient target ratio Ratio0 and the transmission input torque Ti. The step S100 corresponds to processing by the torque shift compensator 77.

In a step S101, the feedback correction amount FBrto is computed by PID control. The step S101 corresponds to processing by the PID controller 84.

In a step S102, the torque shift compensation amount TSrto and feedback correction amount FBrto are added to the transient target ratio Ratio0 to compute the compensated transient target ratio DsrRT0. The step S102 corresponds to processing by the transient target ratio collector 85.

In a step S103, the command value Astep to the step motor 4 is computed. The step S103 corresponds to processing by the target step number calculating element 86 and the step motor command value calculating element 87.

Figure 7:
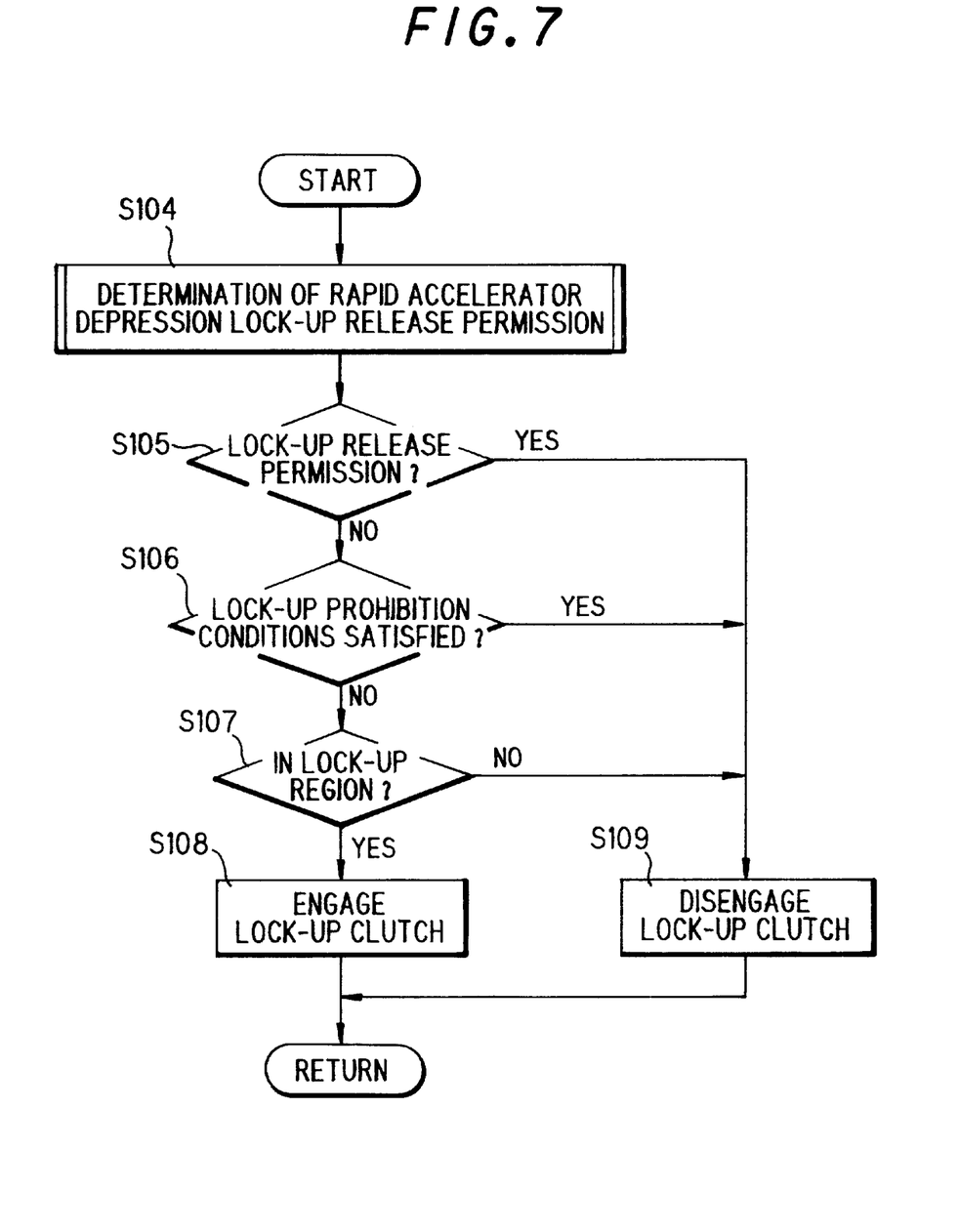
FIG. 7 is a flowchart for describing the main lock-up control routine performed by the controller.

Next, the lock-up control performed by a controller 61 will be described.

FIG. 7 shows the main routine of lock-up control.

Figure 9:
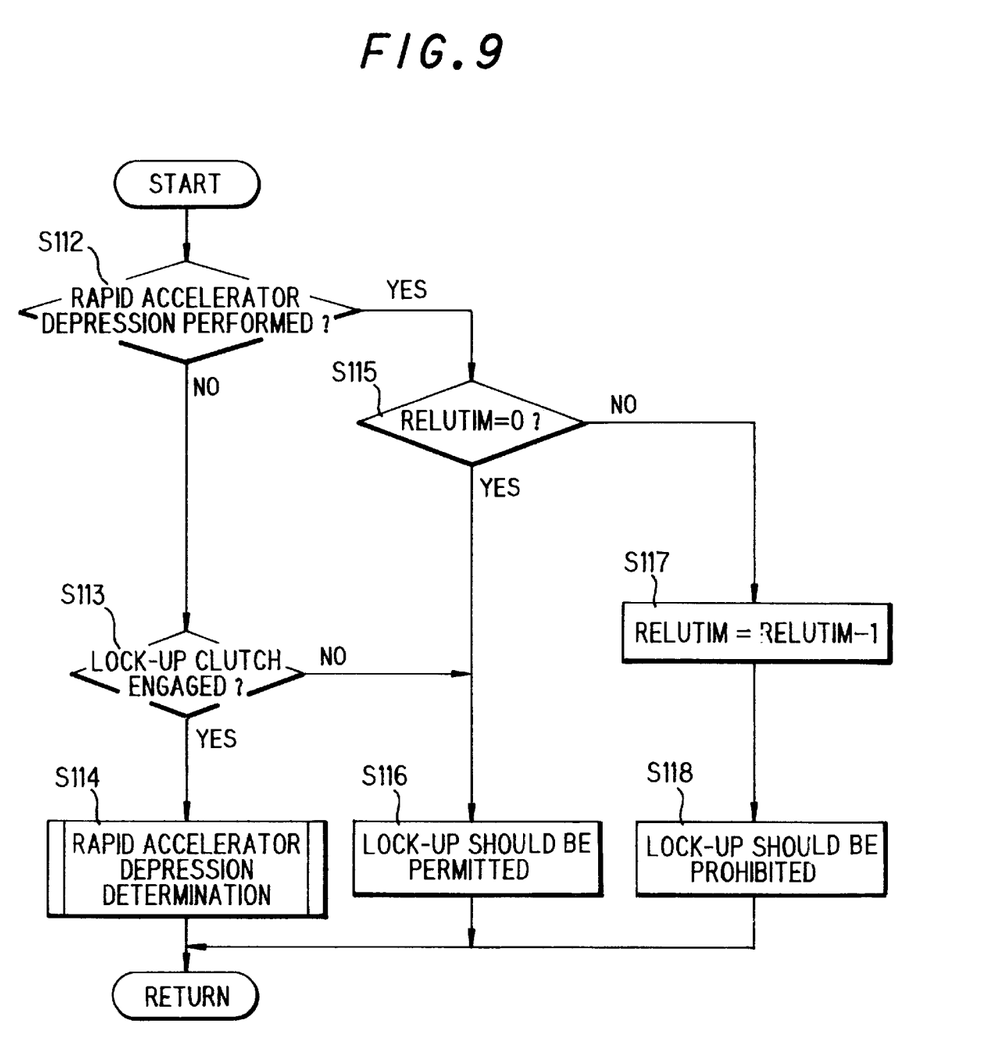
FIG. 9 is a flowchart for describing a subroutine for determining whether a rapid accelerator depression lock-up release is permitted.

First, in a step S104, the subroutine shown in FIG. 9 is performed, and it is determined whether or not rapid accelerator depression lock-up release is permitted. This subroutine will be described later.

In a step S105, it is determined whether the determining result in the step S104 is "lock-up release permission". When the determining result is determined to be "lock-up release permission", the routine proceeds to a step S109, otherwise the routine proceeds to a step S106.

In a step S106, it is determined whether the following conditions which prohibit engaging of the lock-up clutch 105 are satisfied.

the transmission oil temperature is lower than a predetermined temperature,
the ABS 320 is operating,
the TCS 330 is operating,
the vehicle is reversing,
the transmission input shaft rotation speed is lower than a predetermined value.

When any of these conditions is not satisfied, the routine proceeds to a step S107, and when at least one is satisfied, the routine proceeds to a step S109.

Figure 8:
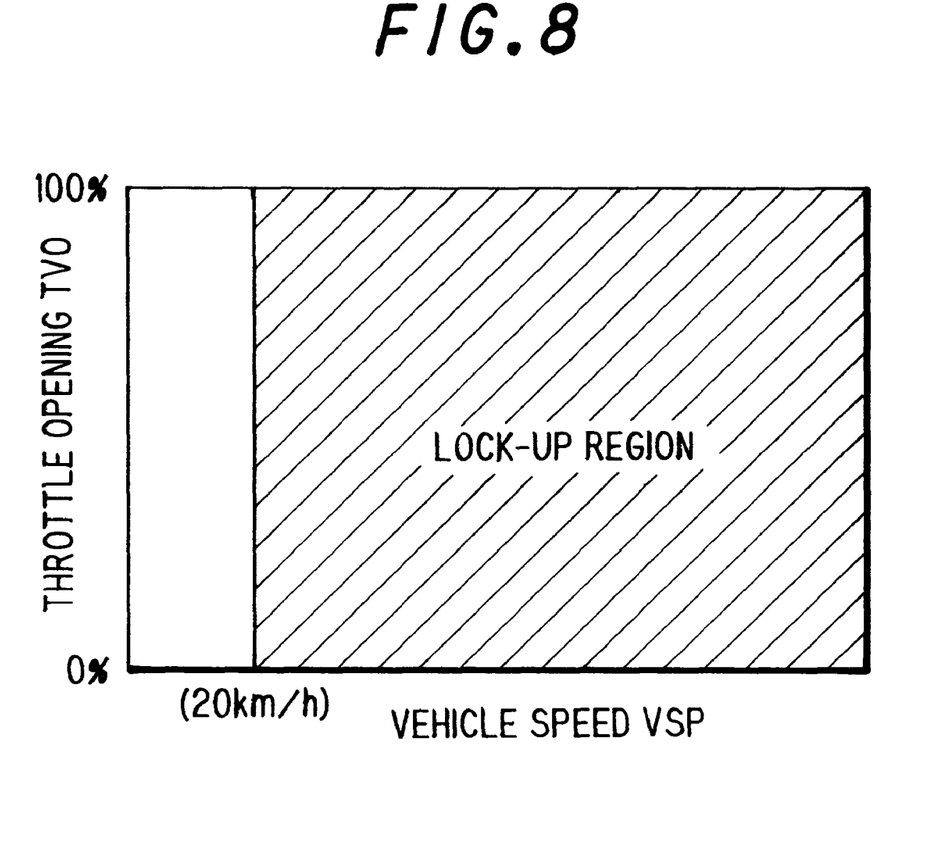
FIG. 8 is a lock-up region determining map used for lock-up control.

In the step S107, it is determined whether or not the vehicle running condition is in a lock-up region based on the vehicle speed VSP and throttle opening TVO. The lock-up region is set as a region higher than a predetermined vehicle speed (for example, 20 km/hour) regardless of the throttle opening TVO, as shown by the shaded region in FIG. 8. When the vehicle speed VSP is determined to be in the lock-up region, the routine proceeds to a step S108, and when it is determined that it is not situated in this region, the routine proceeds to a step S109.

In the step S108, the lock-up clutch 105 is engaged.

In the step S109, the lock-up clutch 105 is disengaged.

Therefore, even when the vehicle is coasting without the accelerator pedal being depressed, the lock-up clutch 105 will be engaged if the vehicle speed VSP is in the lock-up region.

Further, even when the lock-up clutch 105 is engaged, if the rapid accelerator depression lock-up release is permitted or lock-up prohibition conditions are satisfied, the lock-up clutch 105 will be disengaged.

FIG. 9 shows a subroutine for determining whether rapid accelerator depression lock-up release is permitted.

First, in a step S112, it is determined whether a rapid accelerator depression was performed during lock-up coasting. When it is determined that the rapid accelerator depression was performed, the routine proceeds to a step S115, otherwise the routine proceeds to a step S113.

In the step S113, it is determined whether the lock-up clutch 105 is engaged. When it is determined that the lock-up clutch 105 is engaged, the routine proceeds to a step S114, and when it is determined that it is not engaged, the routine proceeds to a step S116.

Figure 10:
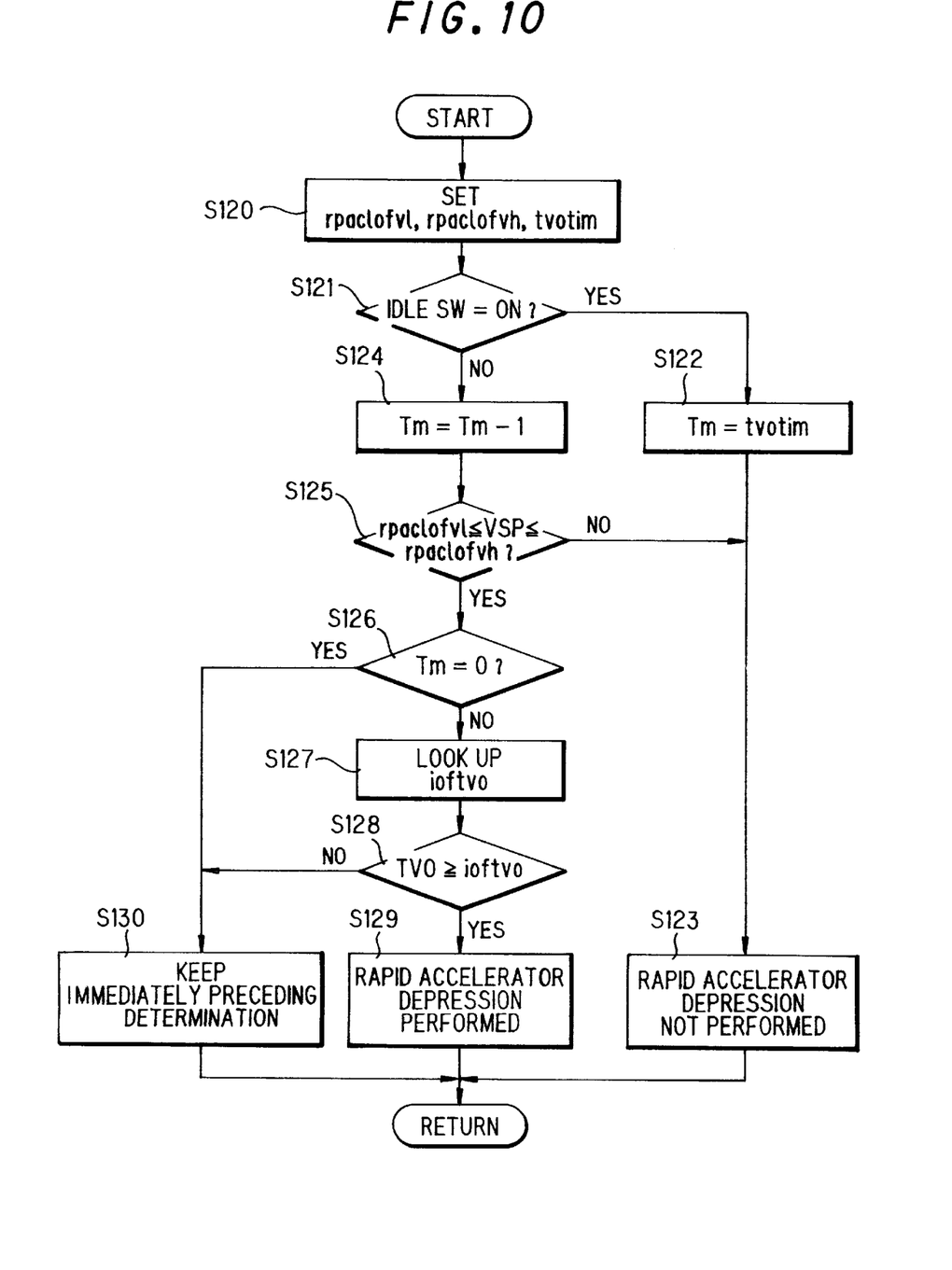
FIG. 10 is a flowchart for describing a subroutine which determines whether the accelerator is rapidly depressed during lock-up coasting.

In the step S114, the subroutine shown in FIG. 10 is performed, and a rapid accelerator depression determination is performed. This subroutine will be described later.

In the step S115, it is determined whether a predetermined time has elapsed after rapid accelerator depression was started during lock-up coasting by determining whether a lock-up temporary release timer RELUTIM became zero. When it is determined that the predetermined time has not elapsed, the routine proceeds to a step S117. When it is determined that it has elapsed, the routine proceeds to the step S116.

The lock-up temporary release timer RELUTIM is pre-stored in the controller 61, and is set to a sufficient value for the torque fluctuation of the engine 101 to be absorbed by the torque converter 102.

In the step S116, engaging of the lock-up clutch 105 is permitted.

In the step S117, the timer RELUTIM is subtracted, and in the step S118, temporary release of the lock-up clutch 105 is permitted (=rapid accelerator depression lock-up release permission).

Therefore, if the accelerator pedal is abruptly depressed in a stepwise manner during lock-up coasting, lock-up release will be temporarily permitted for a predetermined time.

FIG. 10 shows a subroutine for determining whether a rapid accelerator depression was performed during lock-up coasting.

In a step S120, a low vehicle speed threshold value rpaclofvl, high vehicle speed threshold value rpaclofvh, and initial value tvotim of a timer Tm are set according to a speed ratio and a running mode.

In a step S121, it is determined whether or not the accelerator pedal is depressed by a signal from an idle switch 57. When the accelerator pedal is not depressed, the routine proceeds to a step S122, and when the accelerator pedal is depressed, the routine proceeds to a step S124.

In the step S122, the initial value tvotim is set to the timer Tm. In a step S123, it is determined that the accelerator has not been rapidly depressed.

In the step S124, the timer Tm is subtracted.

In the step S125, it is determined whether or not the vehicle speed VSP lies between the low vehicle speed threshold value rpaclofvl and the high vehicle speed threshold value rpaclofvh. When the vehicle speed lies between these values, the routine proceeds to the step S123, and when it does not, the routine proceeds to a step S126. Herein, the low vehicle speed threshold value rpaclofvl and high vehicle speed threshold value rpaclofvh are set so that the low speed region below the low speed threshold value rpaclofv is a non-lock-up region, and the high speed region above the high vehicle speed threshold value rpaclofvh is a region in which vehicle body vibration which this invention aims to eliminate, does not easily occur.

In the step S126, it is determined whether or not the timer Tm became zero, i.e., whether or not a predetermined time has elapsed since the accelerator pedal depression started. When the predetermined time has not elapsed, the routine proceeds to a step S127, and when it has elapsed, the routine proceeds to a step S130.

In the step S127, a throttle opening threshold value ioftvo is set by looking up a table selected according to the speed ratio and running mode. The threshold value ioftvo is set to a larger value the higher the vehicle speed VSP and the smaller the speed ratio. The threshold value ioftvo is set in, for example, three stages according to the vehicle speed VSP and speed ratio. The threshold value ioftvo may be set to any number of stages provided that this number is at least two, and it may also be set to be continuous.

In a step S128, it is determined whether the throttle opening TVO is larger than the threshold value ioftvo. When the throttle opening TVO is larger than the threshold value ioftvo, the routine proceeds to a step S129, and when it is smaller than the threshold value ioftvo, the routine proceeds to the step S130.

In the step S129, it is determined that a rapid accelerator depression was performed.0

In the step S130, the immediately preceding determination is kept as it is.

Therefore, after a predetermined time tvotim has elapsed since an accelerator pedal depression started, if the throttle opening TVO exceeded the predetermined value ioftvo, it is determined that the accelerator pedal was depressed abruptly in a stepwise manner.

Next, the action of the above-mentioned lock-up control will be described.

In a vehicle with a CVT, as the speed ratio can be varied continuously with the lock-up clutch engaged, the lock-up clutch can be engaged at lower speed than in a vehicle with a planetary gear type transmission. According also to this embodiment, if the vehicle speed VSP is in the lock-up region shown in FIG. 8, the lock-up clutch 105 is engaged due to the processing of FIG. 7 proceeding from the step S107 to the step S108 even when the accelerator pedal is released and the vehicle is coasting.

However, when the accelerator pedal is abruptly depressed during lock-up coasting, the processing of FIG. 9 proceeds from the step S112 to the steps S115, S117 and S118, and the lock-up clutch 105 is temporarily disengaged until the timer RELUTIM becomes zero in order to suppress vibration of the vehicle body.

At this time, the threshold value ioftvo used for determination of whether a rapid accelerator depression occurred is set to a smaller value the lower the vehicle speed VSP and the higher the speed ratio. That is, during low speed running or low speed gear running when vibration easily occurs if the accelerator is sharply depressed, the threshold value ioftvo is set to a small value so that it is easy to determine that the rapid accelerator depression was performed.

Therefore, when the vehicle is coasting with the lock-up clutch 105 engaged, when vibration tends to occur if the accelerator is rapidly depressed, it is easy to determine that the rapid accelerator depression was performed. When it is determined that there was such a rapid accelerator depression the lock-up clutch 105 is disengaged, the torque fluctuation of the engine 101 is absorbed by the torque converter 102, and vibration of the drive system is suppressed.

On the other hand, when vibration does not easily occur, or the vibration level is small even if it does occur, the throttle opening threshold value ioftvo is set to a large value so that a rapid accelerator depression is not easily determined. In this case, when vibration due to rapid accelerator depression does not easily occur even if the vehicle is performing lock-up coasting, a rapid accelerator pedal depression is not easily determined even if the accelerator is depressed. If a rapid accelerator depression is not determined, the lock-up clutch 105 will remain engaged, and a high fuel cost-performance will be maintained.

Thus, according to this invention, the threshold value used for determining a rapid accelerator depression is changed over according to the vehicle speed or speed ratio, so fuel cost-performance is improved while vibration due to rapid accelerator depression is suppressed.

The threshold value iomeo is set so that temporary lockup release is harder to be performed the smaller the vibration level expected from the vehicle speed VSP and speed ratio when the accelerator pedal starts to be depressed, so the dual objectives of vibration suppression and improvement of fuel cost-performance are realized regardless of the expected vibration level.

According to this embodiment, a rapid accelerator depression is determined when the throttle opening TVO after the predetermined time tvotim has elapsed since starting to depress the accelerator, exceeds the throttle opening threshold value ioftvo. Therefore, it is unnecessary to differentiate the throttle opening to calculate a throttle rate in order to determine a rapid accelerator depression.

It is also possible to calculate the depression rate of the accelerator pedal from the variation of the throttle opening TVO in a sampling period, and determine whether there was a rapid accelerator depression based on this. However in this case, if the sampling period is short, computational errors become large, and if the sampling period is long, the computation of the depression rate will take time so that the determination will be delayed.

This invention is not limited to the above embodiment. For example, in the above embodiment, the invention is applied to a vehicle with a toroidal CVT, but it can be applied also to a vehicle equipped with a V-belt CVT. It can further be applied to a planetary gear type automatic transmission wherein lock-up is performed during coasting.

Moreover, in the above embodiment, the determination of whether there was a rapid accelerator depression is based on the throttle opening, but the determination of whether there was a rapid accelerator depression may be based on the accelerator pedal depression amount detected by the accelerator pedal depression amount sensor 56.

The entire contents of Japanese Patent Applications P11-280362 (filed Sep. 30, 1999) and P11-280416 (filed Sep. 30, 1999) are incorporated herein by reference.

Although the invention has been described above by reference to a certain embodiment of the invention, the invention is not limited to the embodiment described above. Modifications and variations of the embodiments described above will occur to those skilled in the art, in light of the above teachings. The scope of the invention is defined with reference to the following claims.

What is claimed is:

1. A lock-up control device for a vehicle comprising a transmission and a torque converter with a lock-up clutch, the device comprising:

a sensor which detects a vehicle speed, a sensor which detects either of a throttle opening and accelerator pedal depression amount, and a microprocessor programmed to:

determine whether an accelerator pedal was depressed in a stepwise manner based on either of the throttle opening and accelerator pedal depression amount, and release the lockup clutch when the vehicle is coasting and the lock-up clutch is engaged, and it is determined that the accelerator pedal was depressed in a stepwise manner, wherein the microprocessor is further programmed to:

more easily determine that the accelerator pedal was depressed in a stepwise manner the lower the vehicle speed.

2. A lock-up control device as defined in claim 1, wherein the microprocessor is further programmed to:

more easily determine that the accelerator pedal was depressed in a stepwise manner the larger the speed ratio of the transmission.

3. A lock-up control device as defined in claim 1, wherein the microprocessor is further programmed to:

determine that the accelerator pedal was depressed in a stepwise manner when a throttle opening after a predetermined time has elapsed since the throttle opening started to vary, is larger than a predetermined threshold value, and set this threshold value to be larger the higher the vehicle speed.

4. A lock-up control device as defined in claim 3, wherein the threshold value is further set to be larger the smaller the speed ratio of the transmission.

5. A lock-up control device for a vehicle comprising a transmission and a torque converter with a lock-up clutch, the device comprising:

means for detecting a vehicle speed, means for detecting either of a throttle opening and accelerator pedal depression amount, determination means for determining whether an accelerator pedal was depressed in a stepwise manner based on either of the throttle opening and accelerator pedal depression amount, and means for releasing the lockup clutch when the vehicle is coasting and the lock-up clutch is engaged, and it is determined that the accelerator pedal was depressed in a stepwise manner, wherein the determination means more easily determines that the accelerator pedal was depressed in a stepwise manner the lower the vehicle speed.

* * * * *